INVENTOR.
BY Ralph Weinger
Wooster, Davis & Cifelli
ATTORNEYS.

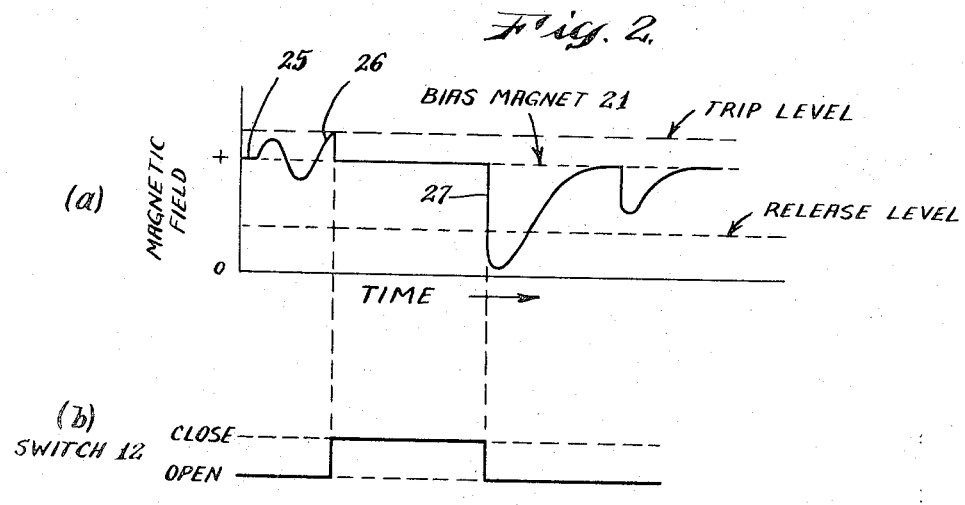
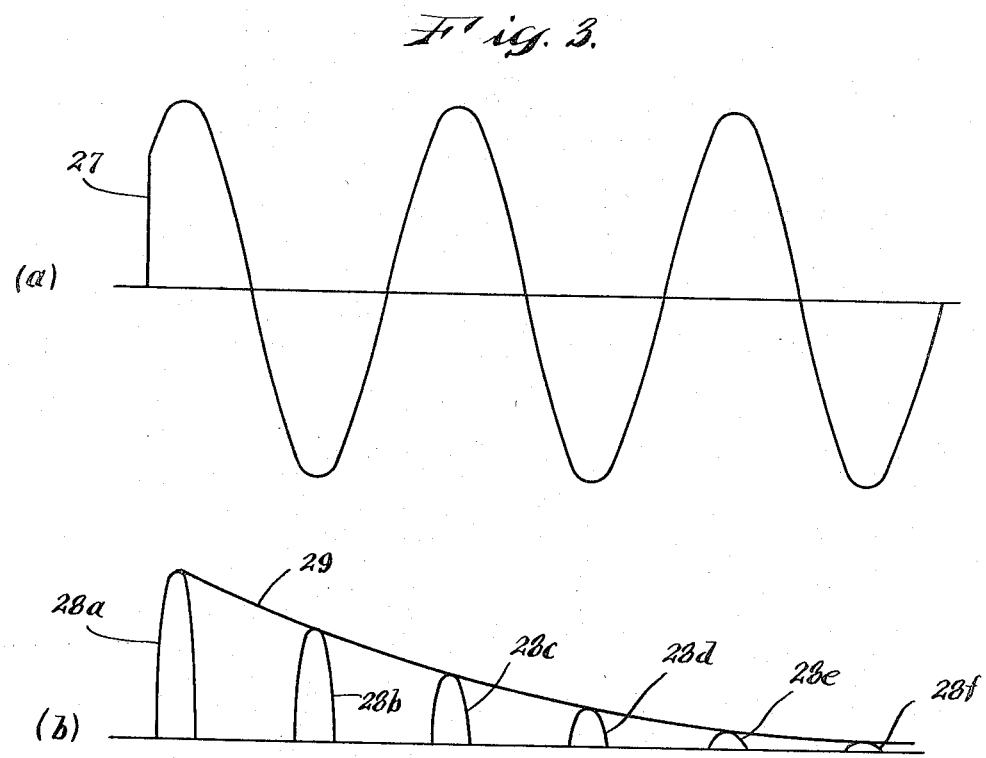

United States Patent Office 3,376,477
Patented Apr. 2, 1968

3,376,477
PROTECTIVE CIRCUIT
Ralph Weinger, Laverock, Pa., assignor to Harvey Hubbell, Incorporated, Bridgeport, Conn., a corporation of Connecticut
Continuation-in-part of application Ser. No. 511,923, Dec. 6, 1965. This application May 12, 1967, Ser. No. 637,942
10 Claims. (Cl. 317—27)

ABSTRACT OF THE DISCLOSURE

A protective circuit for an alternating current electrical load which includes a resetting subcircuit. The subcircuit produces a transient current pulse for establishing a resetting magnetic field regardless of the point in the line voltage cycle at which it is actuated.

---

This application is a continuation-in-part of my application Ser. No. 511,923 for Protective Circuit filed Dec. 6, 1965, now abandoned.

This invention relates to a condition sensing circuit and, in particular, to a circuit for detecting a change in a predetermined differential between two or more currents. The present invention is particularly useful in providing a protective circuit which is easily resettable and inexpensive.

There are many industrial and domestic applications in which it is desired to provide a circuit which protects against certain circuit faults or abnormalities. Such abnormalities include current overloads, short circuits, and current leakages to ground. It is also desirable to employ a device which is effective for protection against major faults, such as heavy overloads and short circuits and against minor faults such as minor surges, shorts or current leakages. It is also desirable for such circuits to include manual means for easily and surely resetting the circuit once the fault has been corrected. The circuit should also be inexpensive to assure a wide market and the distribution of its benefits among a large number of people. Among the uses to which such a circuit might be put would be the protection of swimmers in a pool which is lighted by underwater lights.

It is, therefore, an object of the present invention to provide a protective circuit responsive to major and minor circuit abnormalities that is less expensive than comparable circuits.

Another object of the invention is to provide an inexpensive protective circuit which provides effective protection against major and minor circuit abnormalities.

Another object of the present invention is to provide an inexpensive circuit which assures protection against major and minor abnormalities and which can easily and surely be reset once the faults have been corrected.

Other objects, features and advantages of this invention will be apparent to those skilled in the art from the drawings and specification.

In accordance with the present invention there is provided a protective circuit which includes a very sensitive safety switch, and a substantially less sensitive safety switch. The very sensitive switch is actuated in response to circuit abnormalities to actuate the less sensitive switch. The less sensitive switch thereupon decouples the circuit or the device to be protected from the power supply. An auxiliary subcircuit is employed to reset the very sensitive switch once the fault has been corrected. This reset subcircuit enables the resetting function to be accomplished regardless of the point in the line voltage cycle at which it is actuated.

Figure 1:
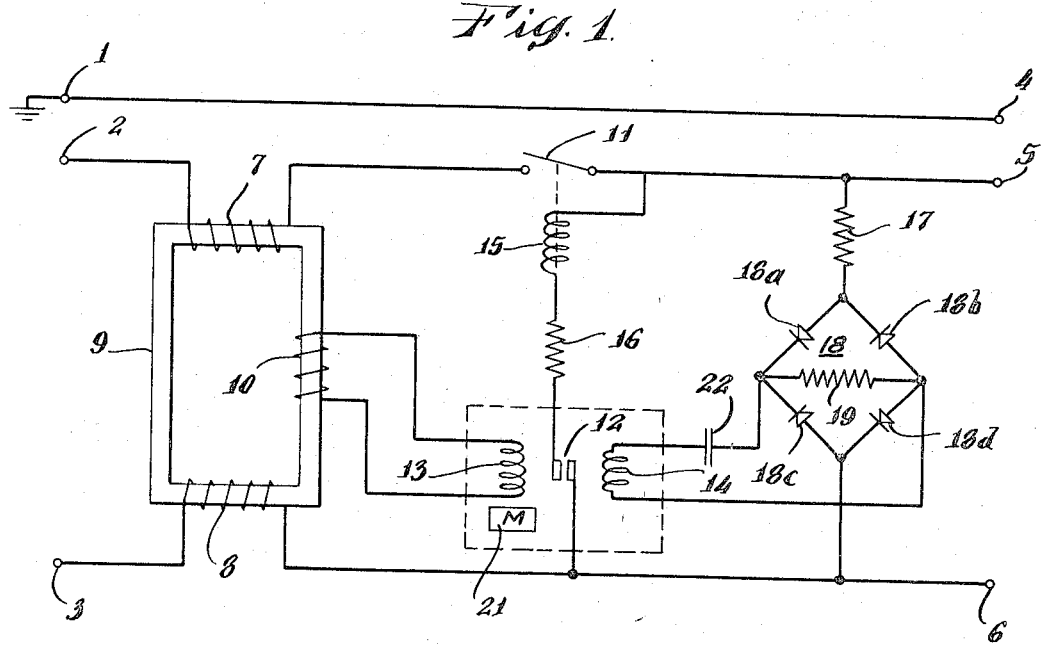
Figure 4:
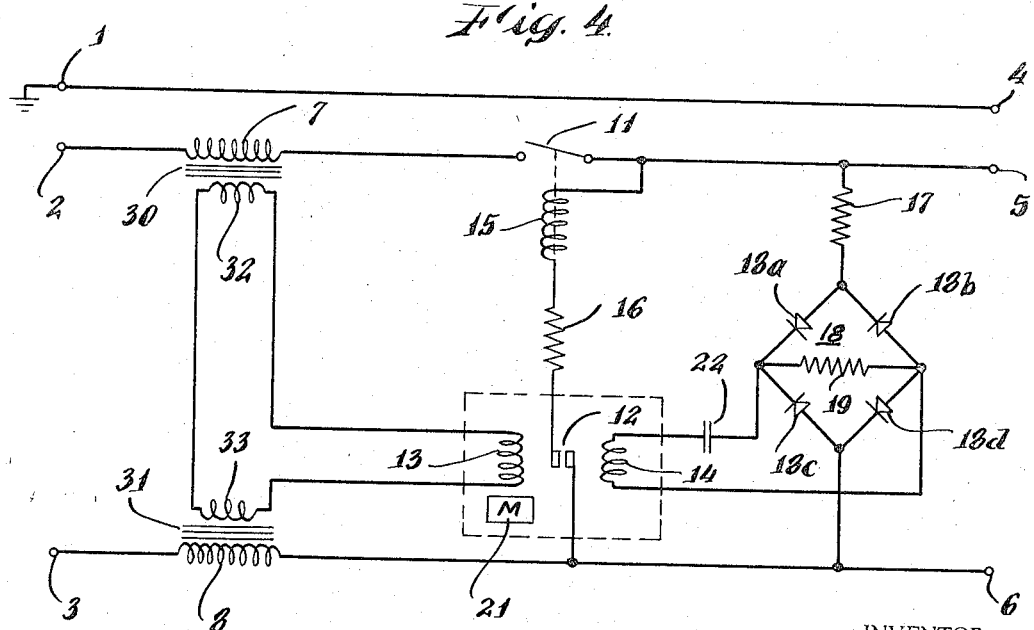

The construction of the invention will now be apparent from the following description, the appended claims and the figures of the attached drawings wherein:

FIG. 1 illustrates the preferred form of circuit embodying the present invention;
FIG. 2 illustrates the manner of operation of the circuit of FIG. 1;
FIG. 3 is an illustration of certain wave forms for illustrating the operation of the invention; and
FIG. 4 is an illustration of a modified form of circuit protective device embodying the present invention.

Referring to FIG. 1 there are shown a number of input terminals 1, 2 and 3, terminal 1 being connected to ground. There are also a number of output terminals 4, 5 and 6 coupled, respectively, to terminals 1, 2 and 3. A load of any kind may be connected to the output terminals.

Two windings 7 and 8 are shown which are coupled, respectively, between terminals 2 and 5 and terminals 3 and 6. They are wound about a unitary core 9. Although windings 7 and 8 are shown wound about core 9, they could also pass through the core forming, in effect, single turn primary windings. A secondary winding 10 is also wound about the core 9. The windings 7 and 8 are so wound with respect to the core that, if they are traversed by equal currents, their respective magnetic fields will cancel one another. Should there be any imbalance in the currents traversing windings 7 and 8 the resultant magnetic field in core 9 will induce a current in detector coil 10 which will also flow through winding 13. Winding 13 is placed in proximity to a very sensitive reed switch 12 that is actuated by a very small magnetic field. Also placed in proximity to switch 12 is a latching magnet 21. Magnet 21 establishes a biasing magnetic field which tends to close the reed switch 12 and thereby increases its sensitivity to the magnetic field produced by winding 13. The magnet 21 also serves to latch the reed switch in the closed position once it has been actuated by the winding 13. Connected in series with the winding 7 between terminals 2 and 5 is a normally closed circuit breaker switch 11. The switch 11 is actuated by a solenoid 15 which is connected in series with a current limiting resistor 16 and the reed switch 12 across the load terminals 5 and 6.

The operation of the circuit protective portion of the invention which has been so far described may best be understood by reference to FIG. 2 in conjunction with FIG. 1. FIG. 2a illustrates the magnetic field in the vicinity of reed switch 12, and FIG. 2b illustrates the closed or opened state of switch 12. The upper horizontal line of FIG. 2a labeled "Trip Level" indicates the value of the magnetic field in the vicinity of switch 12 which is required to trip switch 12 to the closed position. The horizontal line labeled "Bias Magnet 21" indicates the steady state magnetic filed produced in the vicinity of switch 12 by the presence of the bias magnet. The lowermost horizontal line labeled "Release Level" indicates the lowest value of the magnetic field which will retain switch 12 in its closed state once it has been tripped. The solid line in FIG. 2a indicates the total resultant field acting upon the reed switch 12.

Assuming no abnormalities in the load circuit, the only magnetic field operating on the reed switch contacts will be that illustrated at 25 produced solely by the bias magnet 21. Assume now that a fault, such as a leakage to ground, develops on the load side of the FIG. 1 circuit. Under these conditions, part of the return current that would normally flow, say from terminal 6 to terminal 3 through winding 8, will instead return via the external ground. This will produce imbalance between the currents in windings 7 and 8 and the resultant magnetic field in core 9 will induce a current in detector coil 10 and winding 13. Winding 13 will thereupon produce a magnetic field having a value dependent upon the ampere turns produced by the fault. This magnetic field will be superimposed upon that produced by bias magnet 21 causing the cyclical fluctuation indicated in FIG. 2a. When this cyclical fluctuation exceeds the trip level at point 26, it will actuate the reed switch 12 to its closed position as shown in FIG. 2b. The contacts of switch 12 will thereafter remain closed due to the latching function of the bias magnet 21. When reed switch 12 closes, it establishes a current path through winding 7, switch 11, solenoid 15, resistor 16, switch 12, and winding 8. The current traversing solenoid 15 causes it to open the switch 11 and thereby cut off power to the load terminals 5 and 6.

Once the circuit fault has been corrected, the protective circuit must be reset. In many protective circuits this can be accomplished by manually closing switch 11. However, since the bias magnet 21 has latched the contacts of reed switch 12 closed, closure of the switch 11 would merely cause the protective circuit to operate again, reopening the switch 11.

In some prior art circuits, the reset circuit included a series combination of a diode and a reset winding positioned near the reed switch for establishing a magnetic field of sufficient magnitude to open the reed switch. The disadvantage of this arrangement was that if the reset mechanism was actuated at a time when the AC input voltage was not of the proper polarity, the protective circuit would trip once more. It would then be necessary to depress the reset button one or more times in the hope that it would operate during the proper half cycle of the input voltage.

In accordance with my invention, I provide a reset subcircuit which operates to insure resetting of the protective circuit regardless of the point in the input voltage cycle in which resetting is attempted. Furthermore, the reset and circuit breaker switch can be a simple "on-off" switch which considerably reduces the expense of the circuit. My novel reset subcircuit comprises an auxiliary winding 14 located near the reed switch 12, the winding 14 being connected to the output of a full wave rectifier bridge 18 through a capacitor 22. Connected across the output of the bridge and in parallel with the capacitor 22 and auxiliary winding 14 is a resistor 19. The input to the bridge is supplied from load terminals 5 and 6 through the current limiting resistor 17.

In order to understand the operation of the reset subcircuit of this invention, attention is directed to FIGS. 1, 2 and 3. It should first be understood that the objective of this subcircuit is to reduce the magnetic field operating on switch 12 to a value below the release level indicated in FIG. 2a. In order to do this, it is necessary to provide a sufficient number of ampere turns to accomplish the desired result. As the number of turns of the auxiliary winding 14 is fixed, this means that current must be introduced in the appropriate amount. Furthermore, this current should be transient in nature so that as soon as the contacts of switch 12 open they will be ready for subsequent operation. With this understanding, let it be assumed that the circuit fault has been corrected and switch 11 is manually closed during the positive half cycle of the AC line voltage. A current path will be established through resistor 17, diode 18a, resistor 19 and diode 18d. The potential thus established across resistor 19 will cause a current pulse to pass through capacitor 22 and auxiliary winding 14. The magnetic field produced by this current pulse through winding 14 opposes that created by the bias magnet 21, causing the resultant magnetic field as illustrated in FIG. 2a to be reduced as at 27. As the resultant field drops below the release level, the natural resilience of the reed switch contacts of switch 12 causes them to open. Alternatively, the resultant field may pass through "O" and create a positive opening effect on the contacts of reed switch 12. The solenoid 15 and switch 11, having a relatively high inertia and inductance, cannot respond to current as rapidly as the reed switch. Accordingly when switch 12 is reopened the response of the switch 11 is nullified so that it will not reopen. A typical response time for switch 12 would be on the order of one millisecond while that of the circuit breaker formed by switch 11 and solenoid 15 might be more than several milliseconds. It will be noted from FIG. 2a that, after the low point of the magnetic field is reached, it thereafter is reestablished in a rapid exponential manner to the level established by bias magnet 21. The particular form of the exponential decay of the current pulse is established by the time constant determined by the value of the capacitor 22 and the values of the resistors 17, 19.

The manner in which the resetting current pulse is established is shown in more detail in FIG 3.

FIG. 3a illustrates the sinusoidal wave form of the power supply from the time 27 at which switch 11 is closed.

FIG. 3b illustrates the train of pulses 28a–28f which are produced across the output of the full wave rectifier bridge 18. The envelope 29 thus represents the current flow passing through capacitor 22 to the reset winding 14.

It will be understood by those skilled in the art that if switch 11 is closed manually during the negative half cycle of the input voltage that the input current to bridge 18 will then pass through diode 18c, resistor 19, diode 18b and resistor 17. However, the voltage established across resistor 19 will have the same polarity as in the previous instance so that the resultant current pulse and magnetic field established will be in the same direction and will reopen the switch 12 in the same manner.

The reset circuit of this invention can be employed at any time with certainty and repeated attempts are unnecessary. It will also be apparent that predetermined imbalance in the currents through windings 7 and 8 will actuate the protective circuit regardless of the cause of such imbalance. Among the causes of such imbalance would be a leakage of current from one line to ground. Such a leakage might be established, for example, through a person or animal between either supply lead and ground. Regardless of the cause, the protective circuit would operate immediately. In the form of the invention shown in FIG. 1 the following components and values were employed and were found to produce highly satisfactory results although, of course, other values may be chosen for particular design considerations.

| Component No.: | Value or description |
| --- | --- |
| 11, 15 | Heinemann P8 circuit breaker. |
| 12 | Gordos 306 reed switch. |
| 13 | 72 turns of #20 wire. |
| 14 | 1000 turns of #38 wire. |
| 16 | 270 ohms, 2 watts. |
| 17 | 750 ohms, ½ watt. |
| 18a, 18b | All diodes type 1N645. |
| 18c, 18d | Do. |
| 19 | 220,000 ohms, ½ watt. |
| 22 | 2 microfarads, 200 volts. |

In FIG. 4 there is illustrated a modification of the circuit of FIG. 1 which is similar in most respects and wherein similar reference numerals are given to similar elements. The primary distinction is that the windings 7 and 8 are wound on separate cores 30, 31 and each core is, in turn, provided with a separate secondary winding 32, 33. The secondary windings are in series with each other and with the winding 13. In normal operation, equal and opposite currents are induced in the windings 32, 33 so that no magnetic field is produced by winding 13. Upon an imbalance, however, the resultant current sets up the necessary tripping field adjacent winding 13.

The circuit of FIG 1 is, however, to be preferred to the circuit of FIG. 4 because of the practical difficulty in achieving proper balance between the cores 30, 31 and their respective secondary windings.

It will be understood by those skilled in the art that various other modifications of this invention are possible. Accordingly, the foregoing description is to be construed as illustrative only rather than limiting. This invention is limited only by the scope of the following claims.

What I claim as new and desire to secure by Letters Patent of the United States is:

1. In a protective circuit which includes a first switch and a second normally closed switch coupled thereto which is considerably less sensitive than said first switch and also includes inductive means for detecting a predetermined inequality in the currents flowing into and away from a load circuit to be protected, and in which said inductive means actuates said first switch in response to said detected inequality and said first switch thereupon causes said second switch to open to decouple said load circuit from its source of AC power, means for enabling the resetting of said first switch in response to the reclosure of said second switch after said inequality ceases regardless of the point in the cycle of said AC power at which said reclosure occurs.

2. In the protective circuit according to claim 1, wherein said resetting means includes a full-wave rectifier coupled across said first and second switches and also includes an inductive means coupled to said rectifier and positioned near said first switch to open said first switch in response to restoration of power to said load by reclosure of said second switch.

3. A protective system for a load circuit comprising:
(a) first switching means which includes latching means,
(b) second switching means coupled to said first switching means, to said load circuit, and adapted to be coupled to an input source of power, said second means being considerably less sensitive and requiring more time to respond than said first means,
(c) means which responds to the detection of a circuit abnormality by actuating said first switching means, said first switching means thereupon latching and causing said second switching means to open thereby decoupling said load circuit from said input source, and
(d) mean coupled to said input circuit for unlatching said first switching means at any desired time in response to the reclosing of said second switching means, said unlatching means operating before said second switching means is capable of reopening in response to the reapplication of power from said source thereto, the unlatching of said first switching means thereby de-energizing said second switching means and preventing its reopening.

4. The protective system according to claim 3 wherein said (c) means includes first and second windings coupled between said input source and said load circuit, said first and second windings producing unequal and opposite magnetic fields whenever, due to said circuit abnormality, the respective currents traversing them are unequal by a predetermined amount and also includes means responsive to said unequal fields, for applying the differential field to actuate said first switching means.

5. A protective system for a load circuit comprising:
(a) a pair of input terminals adapted to be connected to a source of power,
(b) a pair of output terminals adapted to be connected to said load,
(c) first inductive means for producing a first magnetic field coupled between one of said input terminals and a corresponding one of said output terminals,
(d) second inductive means for producing a second magnetic field coupled between the other of said input terminals and the other of said output terminals,
(e) a first switch includes latching means therefor,
(f) a second switch coupled to said first switch, said second switch being considerably less sensitive and requiring more time to respond than said first switch,
(g) third inductive means for activating said first switch in response to a predetermined difference between said magnetic fields, said activated first switch thereupon actuating said second switch which opens to decouple said output terminals from said power source, and
(h) means in circuit across said output terminals for unlatching said first switch at any time after correction of said abnormality, and after power has been restored to said output terminals by reclosing of said second switch.

6. The system according to claim 5 wherein said first switch has magnetic latching means and wherein said resetting means includes a full-wave rectifier bridge whose input is coupled to said output terminals and whose output is coupled to a fourth inductive means located in proximity to said first switch, said fourth inductive means producing a magnetic field in response to the restoration of power to said output terminals which overcomes the effect of said magnetic latching means.

7. The system according to claim 5 wherein said first switch is a reed switch and said third inductive means includes a first winding positioned to be threaded by said first and second magnetic fields and also includes a second winding in circuit with said first winding and positioned near said reed switch for closing the latter whenever a predetermined voltage is induced in said first winding by the difference in said first and second magnetic fields.

8. The system according to claim 6 wherein said resetting means also includes a capacitor between the output of said bridge and said fourth inductive means.

9. The protective system according to claim 5 wherein said power source furnishes alternating current, wherein said second switch includes a pair of normally closed contacts between said other input terminal and said other output terminal, said second switch also including a solenoid for opening said contacts when energized, said solenoid having one terminal coupled to one of said contacts, and wherein said first switch has one terminal coupled to the other terminal of said second switch and its other terminal coupled to said other output terminal.

10. In a protective circuit including means for generating a tripping signal in response to a predetermined inequality in the currents flowing into and away from an alternating current load circuit to be protected, circuit breaker means in said load circuit, sensitive switch means closable in response to said tripping signal to open said circuit breaker means, and means for latching said sensitive switch means in its closed position, the improvement which comprises: a resetting winding adjacent said sensitive switch means to establish a magnetic field acting to open said sensitive switch means; and current pulse producing means energizable from said load circuit upon closure of said circuit breaker means to supply a unidirectional transient current to said resetting winding regardless of the polarity of the load voltage at the time of closure.

References Cited
UNITED STATES PATENTS

| | | | |
|---|---|---|---|
| 3,165,671 | 1/1965 | Mintz et al. | 317—27 |
| 3,214,638 | 10/1965 | Moser et al. | 317—27 X |
| 3,337,771 | 8/1967 | Weinger | 317—27 X |

MILTON O. HIRSHFIELD, *Primary Examiner.*

J. D. TRAMMELL, *Assistant Examiner.*